Dec. 16, 1941.   C. L. GREEN   2,266,597
BRAKE CONTROL MECHANISM
Filed Sept. 2, 1939

Charley Laurence Green
INVENTOR.

BY Cecil L. Wood
ATTORNEY.

Patented Dec. 16, 1941

2,266,597

UNITED STATES PATENT OFFICE 2,266,597

BRAKE CONTROL MECHANISM

Charley Laurence Green, Freer, Tex., assignor of one-third to O. W. Schroeder, Freer, Tex.

Application September 2, 1939, Serial No. 293,246

5 Claims. (Cl. 303—84)

This invention relates to certain new and useful improvements in brake control mechanism as applied to fluid actuated brakes on wheeled vehicles.

At present, the conventional hydraulic braking system is so constructed that in case of one brake becoming inoperative because of a leak in the pipe leading to it from the master cylinder, or in the brake cylinder itself, the entire system will become inoperative, as the braking fluid will waste through the aforesaid leak, and no pressure will be applied to the remaining brakes.

In other conventional forms of braking systems, means are provided to automatically cut out any leaking cylinder from the system. The remaining brakes being operative, this results in an unequal braking effect, and will cause the vehicle to swerve from its normal course when the brakes are applied.

One purpose of this invention is to eliminate such unsymmetrical braking.

Another advantage of this invention consists in dividing the brakes into two complete systems so arranged that in case of failure of the brakes on any one wheel, the wheel on the opposite side of the vehicle runs free of the brake, while the braking power on the other pair of wheels remains unimpaired.

Also, this mechanism insures an equal pressure on all of the brakes when they are operating normally without leaks.

Another advantage of this mechanism is its simplicity and comparatively low cost of manufacture and the ease with which it may be installed.

On the accompanying drawing.

This specification with the accompanying drawing, wherein like reference numerals refer to like parts throughout, fully describes the invention.

Figure 1:
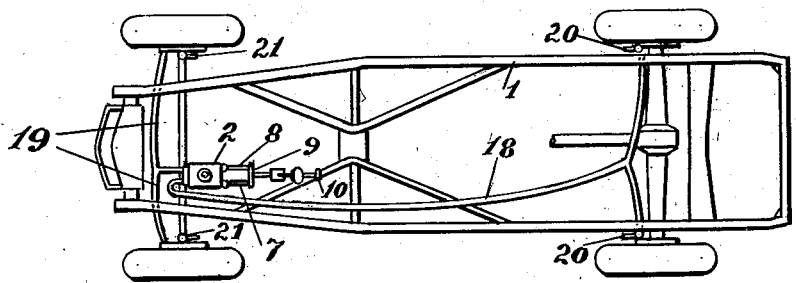
Fig. 1 is a plan view of the mechanism, showing it attached to the frame of a four wheeled vehicle.

1 is the frame of a typical vehicle on which is mounted the body 2 of the control mechanism. The body 2 contains a multiplicity of cylinders, 3 and 4, in which travel the brake actuating pistons 5 and 6, which are connected by means of the rods 7 and 8 to the cross head 9, so arranged that when the operating pedal 10 is depressed equal pressure is applied to the pistons 5 and 6.

The pistons 5 and 6, when completing their active stroke, are returned to position by the springs 10'. Liquid in the cylinders 3 and 4 is forced by the movement of the pistons 5 and 6 through the openings 11 and 12 into the cylinder 13, in which travels the floating piston 14, which is normally balanced in a medial position by the springs 15 and 16. The ends of the cylinder 13 are tightly closed by the screw plugs 17. The discharge of the cylinder is through the tubes 18 and 19, each leading to and independently actuating hydraulic brakes 20 and 21. The brakes are of the usual piston operated type.

The liquid receptacle 22 is directly over the cylinders 3 and 4 and is kept constantly full of operating liquid to the exclusion of air by means of the filling plug 23.

In connection with the oil reservoir 22, it will be noted that the two master cylinders, 3 and 4, having the piston assemblies 5 and 6 respectively are arranged parallel and are integral with the oil reservoir 22, and that each is provided with an individual valve assembly governed by floats 31.

The integral equalizing cylinder 13, carrying the equalizing piston 14, is arranged transversely to the master cylinders. The equalizing piston 14, normally retained intermediate the ends of the cylinder 13 by the springs 15 and 16, acts to shut off faulty mechanism, and permits the rest of the assembly to function normally.

The ports 24 and 25 are open between the liquid receptacle 22 and the cylinders 3 and 4, and the first movement of pistons 5 and 6, put into action through the piston rods 7, by means of pressure on the foot pedal, is to close the said ports 24 and 25, thus insuring that the cylinders 3 and 4 are kept constantly filled with liquid.

The cylinders 3 and 4 are also connected with the liquid receptacle 22 by the ports 26 and 27 and are closed respectively by the valves 28 and 29, which are mounted on common stems 30 and operatively attached to the floats 31.

The wearing surfaces of the cylinders 3 and 4 are protected from abrasion from dust by the rubber packing 32.

Normally, while the braking system is at rest, the float 31 would keep the valve 29 in position to close the openings 27, and the valve 28 would be open, allowing free flow of the filling fluid into the chamber above the valve 29. Should the pressure on one cylinder be slightly higher than on the other, the pressures would be equalized by the action of the floating piston 14.

Should a leak occur in the part of the braking system, for example that part controlled through the tube 18, the lessened pressure in the cylinder 4, would cause the float 31 to sink, closing the ports 26 with the valves 28. Through the port 12, pressure would be applied to one side of the spring equalized piston 14 moving it into a position covering the port 11, thus allowing all of the braking power to be exerted upon that portion of the brakes operated through the tube 19.

Thus, any leak in the braking system causing a loss of pressure and braking power can only affect that part of the braking system fed by one cylinder.

Figure 2:
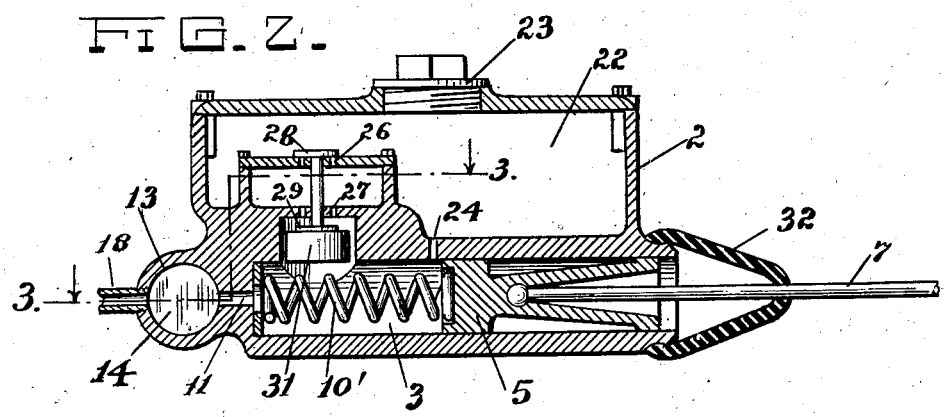
Fig. 2 is a vertical section showing the operating parts of the device.
Figure 3:
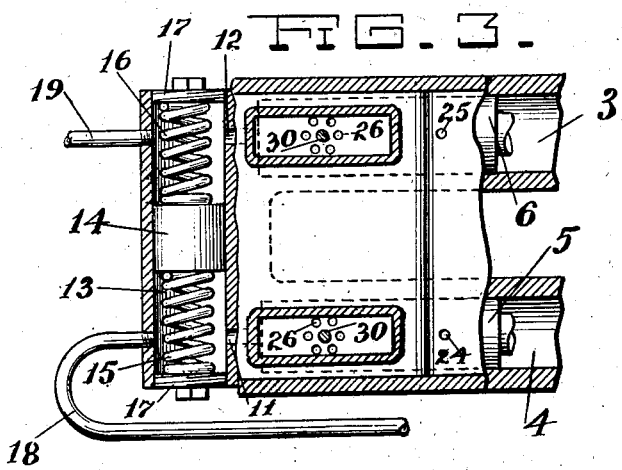
Fig. 3 is a broken horizontal section taken on the line 3—3 of Fig. 2.

The floating valve 14 is free to slide in either direction to equalize pressure in cylinders 3 and 4. When the cylinders 3 and 4 are filled, the valve 29 will close port 27 so fluid cannot back up when pressure is applied. It is necessary that fluid is contained in the cylinders 3 and 4 in order that the valve 28 may open as the fluid in the cylinders is necessary to raise the float 31. Should one of the cylinders be drained the float will drop down into a position as shown in Figure 2 of the drawing and port 26 will be closed so that fluid will not be drained from the reservoir 22. The valve 28 will close port 26 as soon as the cylinder is drained, and thus the liquid contained in the chamber between the ports 26 and 27 only would be drained and thus prevent loss of the fluid contained in the chamber 22.

Having thus fully described my invention, I claim:

1. A brake operating control mechanism for fluid pressure braking systems comprising a fluid filled chamber having controlled connections to a multiplicity of cylinders having pistons adapted to apply pressure to the fluid contained therein; a multiplicity of float actuated valves adapted to maintain the fluid at a predetermined level in the said cylinders, and a balanced pressure operated piston valve adapted to cut off any of the said cylinders from the pipe line reducing the pressure therein.

2. In a brake operated mechanism for fluid pressure braking systems, the combination with a series of fluid actuated brakes of a means for operatively actuating simultaneously a multiplicity of pistons into fluid filled cylinders in such a manner as to apply pressure to the liquid contained therein; a fluid filled chamber having passages communicating with all of said cylinders; float controlled valves attached to each cylinder, adapted to maintain the fluid at a predetermined level in such cylinders, and a floating balanced piston valve adapted to cut off any cylinder from a defective pressure reducing part of the braking system.

3. A brake operating control mechanism for fluid pressure braking systems comprising a fluid reservoir, a plurality of cylinders having brake applying pistons therein, a chamber in one wall of each cylinder and communicating therewith and float controlled valves in the chambers controlling passage of fluid from the reservoir to the cylinders.

4. A brake operating control mechanism for fluid pressure braking systems comprising a fluid reservoir, a plurality of cylinders having brake applying pistons therein, a plurality of fluid chambers having intake and discharge ports admitting fluid from the reservoir into the chambers and discharging fluid from the chambers into the cylinders, valves for said ports, means connecting the valves for opposite opening and closing movement and floats for actuating said valves and controlled by the fluid level in said cylinders.

5. A brake operating control mechanism for fluid pressure braking systems comprising a fluid reservoir, a plurality of cylinders having brake applying pistons therein, a plurality of fluid chambers having intake and discharge ports admitting fluid from the reservoir into the chambers and discharging fluid from the chambers into the cylinders, said chambers being arranged to admit fluid from the reservoir to the cylinders by gravity, floats controlled by the fluid in said cylinders and valves carried by the floats for each of said ports and arranged for opposite opening and closing movement to prevent at all times direct communication between the reservoir and the cylinders.

CHARLEY LAURENCE GREEN.